United States Patent [19]

Araya

[11] 3,847,031
[45] Nov. 12, 1974

[54] CONNECTING LINK OF ROLLER CHAIN
[76] Inventor: Kumakichi Araya, No. 2, Daishoji Seki-machi, Kaga-shi, Ishikawa-ken, Japan
[22] Filed: June 5, 1973
[21] Appl. No.: 367,129

[30] Foreign Application Priority Data
June 16, 1972  Japan.............................. 47-59399
Sept. 25, 1972  Japan.............................. 47-95226
Sept. 28, 1972  Japan.............................. 47-96631

[52] U.S. Cl..................... 74/258, 74/250 R, 74/254
[51] Int. Cl. ........................................F 16g 13/02
[58] Field of Search....... 74/250 R, 258, 254, 255 R

[56] References Cited
UNITED STATES PATENTS
992,740    5/1911   Taylor............................... 74/258 X
1,121,053  12/1914  Terry.................................. 74/258
1,193,098  8/1916   Wheeler............................. 74/258

Primary Examiner—Leonard H. Gerin
Attorney, Agent, or Firm—Stevens, Davis, Miller & Mosher

[57] ABSTRACT

A connecting link of roller chain including a pair of link plates for connecting both ends of a length of chain, one link plate of said pair of link plates having a pair of connecting pins inseparable secured thereon, the other link plate fitted over said connecting pins adjacent to the free ends thereof, and a locking member placed outwardly on said other link, wherein said locking member per se is made of resilient shock absorbing material, such as plastic resin or rubber, or the intervening resilient shock absorbing means is provided where a metallic locking member is engaged with said connecting pins.

5 Claims, 10 Drawing Figures

PATENTED NOV 12 1974

CONNECTING LINK OF ROLLER CHAIN

DESCRIPTION OF THE PRIOR ART

In the prior art endless chain, the connecting or closing link consists usually of one link plate having a pair of connecting pins integrally mounted thereon, the other link plate fitted over said pair of said connecting pins and placed oppositely to said one link plate with both end links of a length of chain located between said one and said other link plate, and a U-shaped locking clip placed outwardly on said other link plate and removably engaged with the pair of connecting pins adjacent to the free ends thereof. However, such a connecting link becomes the weakest link in the whole roller chain, since the V-shaped locking clip is easily worn out or broken, thus releasing the adjoining link plate against which the locking clip rests, hence resulting in a break of the roller chain, particularly in case of roller chains of recent years which are used under severe conditions, or which are subjected to transverse stress due to vibration and misalignment between the chain and sprocket wheels about which the chain is entrained.

SUMMARY OF THE INVENTION

The present invention relates to a connecting link of roller chain, more particularly a connecting link of roller chain for connecting both ends of a length to form a closed loop.

The present invention is a device to overcome disadvantages of the prior art roller chains described above.

It is an object of the present invention to provide a connecting link of roller chain working properly for a long period of time while reducing the weight of the whole roller chain considerably.

It is another object of the present invention to provide a connecting link of the roller chain which is simple in construction, economical in cost, and durable under heavy duty.

According to the present invention, there will be provided a connecting link of roller chain, comprising a pair of link plates for connecting both ends of a length of chain, one link of said pair of said link plates having a pair of connecting pins integrally secured thereon adjacent to both ends of said one link plate, the other link plate fitted over said connecting pins adjacent to free ends thereof, and locking means of resilient material, such as plastic resin or rubber, placed outwardly on said other link plate and having a pair of openings snapped over said pair of said connecting pins adjacent to free ends thereof.

BRIEF DESCRIPTION OF THE DRAWINGS

Now, preferable embodiments of the connecting link of roller chain according to the present invention will be described in detail hereinafter by way of examples with reference to the accompanying drawings in which.

Referring to FIG. 1, there is shown the prior art connecting link CL for connecting both end links of a length of chain C. The connecting link CL comprises a pair of link plates 6, 8, a pair of connecting pins 7, 7, and an U-shaped locking clip 9 which is placed adjacent the link plate 6 and snapped into annular grooves 7d provided on the connecting pins 7, 7. Normally, both connecting pins 7, 7 are integrally connected to a link plate in one side, i.e., an upper link plate 8 in FIG. 2 which will be referred to as "connecting pin link plate" hereinafter. The other link plate 6 is fitted over both connecting pins 7, 7 by means of openings provided adjacent to both ends thereof, with a roller link plate 1 at the end of the length of chain C located between the link plates 6 and 8. The link plate 6 will be referred to as a "connecting link plate" hereinafter. A roller 3 is rotatably mounted over each of the connecting pin 7, which is inserted into the opening provided on the roller link plate 1 and lined with suitable bushing 2. The U-shaped locking clip 9 of thin steel plate is easily snapped into and removed from the annular grooves 7d on the connecting pins 7, 7 for the reason of the U-shaped configuration. Also, a pin link plate 4 contacting one side of the said roller link plate 1 is fixed to the pin 5, and said pin 5 passes through the opening of the said bushing 2.

FIG. 3 shows an oval locking plate 10 according to the first embodiment of the present invention of rubber, such as natural or fluorine rubber, or resilient plastic resin such as vinyl chloride or polyethylene, or light alloy of aluminum or magnesium or teflon (a trade name), all of which have sufficient strength and are less heavier than steel. The locking plate 10 is provided adjacent to both ends thereof with a pair of openings 11, 11 for receiving a pair of connecting pins 7, 7 respectively. A diameter of each opening 11 is less than that of the annular groove 7d provided on the connecting pin 7, in FIG. 2, such as that the locking plate 10 is forcibly fitted over the connecting pin 7 and firmly retained in the annular groove 7d. The locking plate 10 is pressed against the connecting link plate 6 so as to hold the latter in its proper position.

FIG. 4 shows an oval locking plate 12 according to the second embodiment of the present invention. This locking plate 12 differs from the locking plate 10 of the first embodiment only in that the plate 12 is the reinforced in peripheral portion of the opening 13 by means of a suitable reinforcing member 14 such as sheet metal or glass fiber.

FIG. 5 shows a locking plate 19 according to the third embodiment of the present invention. The locking plate 19 is made of steel plate, and provided with both openings, the diameter of which is slightly less than that of the connecting pin 16, 16. The annular groove 16r provided on each connecting pin 16 is covered by a layer of resilient shock absorbing material 17. As usual, the locking plate 19 is pressed against the connecting pin link plate 18. Since the locking plate 19 is indirectly in contact with the connecting pin 16, the locking plate 19 will be protected from impact or vibration, thus extending its service life. Also, the connecting pin link plate 15 is fixed to the one end of the said connecting pin 16, 16 respectively.

FIGS. 6 to 8 show a fourth embodiment according to the present invention. In this embodiment, each of both connecting pin 22, 22 is provided adjacent to free ends thereof with an opening (e). A linear member 23 of relatively soft and shock absorbing material, such as duralumin wire, is inserted into the above-mentioned opening (e). As shown in FIG. 7, a linear member 23 is passed through both connecting pins 22, 22 and retained in contact with the connecting link plate 24 so as to lock the latter in proper position. As shown in FIG. 8, the opening (e) provided on each connecting pin 22 is lined with shock absorbing member 25 such as rubber lining, and the abovementioned linear member 23 is inserted, into the openings g pierced in the said shock absorbing member 25. The linear member 23 may be bent at the extended end portion thereof in suitable manner so as to prevent it from being removed out of the shock absorbing member 25. Also, a connecting pin link plate 21 is fixed to the one end of the said connecting pin 22, 22 respectively.

FIGS. 9 and 10 show a fifth embodiment according to the present invention. The connecting pins 32, 32 are integrally connected to the connecting pin link plate 33 as usual. 32a shows a pierced end of each pin for securing the latter on the connecting pin link plate 33. A pair of bushings 31, 31 are provided on roller link plates 30, 30 at both ends of the length of chain. The connecting pins 32 32 are fitted respectively into the bushings 31, 31 described above. The U-shaped locking clip 34 is snapped into annular grooves 32d, 32d on the connecting pins 32, 32 located adjacent to free ends 32e, 32e thereof, after which connecting link plate 35 is fitted over the connecting pin 32, 32, as shown in FIG. 10. A resilient rubber sheet 36 is inserted between the connecting link plate 35 and the locking clip 34 and adhered to the former. The locking clip 34 is made of light metal, such as aluminum or magnesium alloy, or heat-resisting resilient plastic resin, for instance polyacetal resin. The connecting pin 32 is extended somewhat longer at the lower end as shown in FIG. 10, so as to prevent the locking clip 34 from becoming released from the connecting link. Since the resilient rubber sheet 36 will absorb the impact applied on the connecting link plate 35 in a direction K in FIG. 10, thereby reducing or cancelling a transverse force working on the locking clip 34. Therefore, the locking clip 34 is protected from wear and damage. Since the locking clip 34 per se is made of material lighter and stronger than that used for the conventional clip, thus improving the strength of the locking clip. Also, heat-resisting and resilient material used in the connecting link according to the present invention will prevent the connecting link from deterioration due to heat, and extend the service life of the same.

Figure 1:
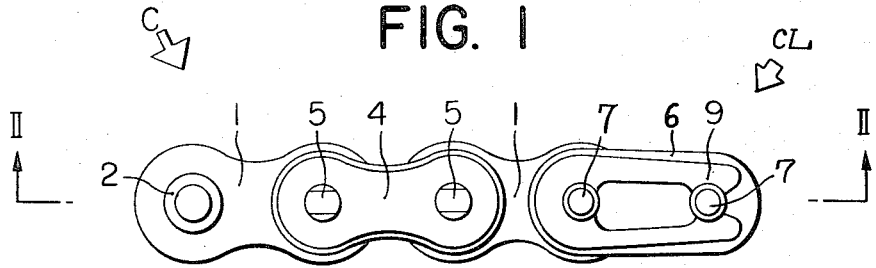
FIG. 1 is a front view showing the prior art of roller chain.
Figure 2:
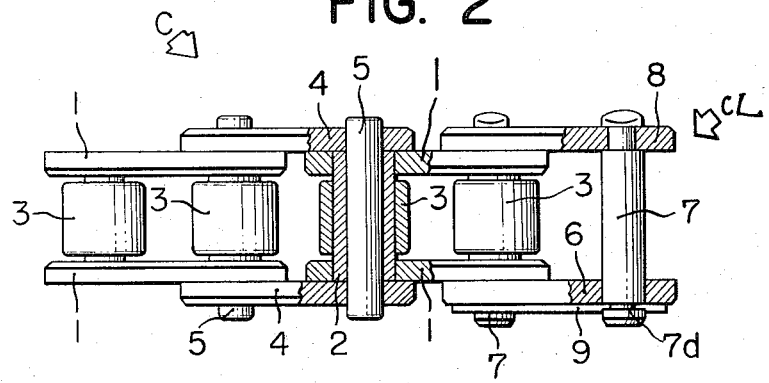
FIG. 2 is a sectional view taken along line II—II in FIG. 1.
Figure 3:
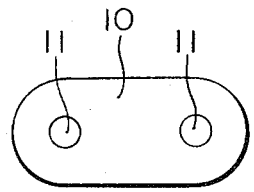
FIG. 3 is a front view showing a first embodiment of the locking member according to the present invention.
Figure 4:
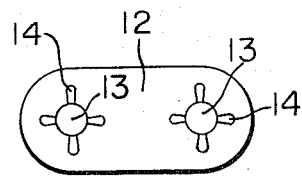
FIG. 4 is a front view showing a second embodiment of the locking member.
Figure 5:
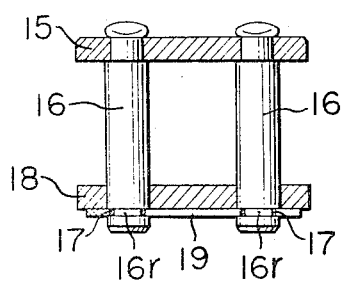
FIG. 5 is a sectional view showing a third embodiment of the locking member.
Figure 6:
FIG. 6 is a sectional view showing a fourth embodiment.
Figure 7:
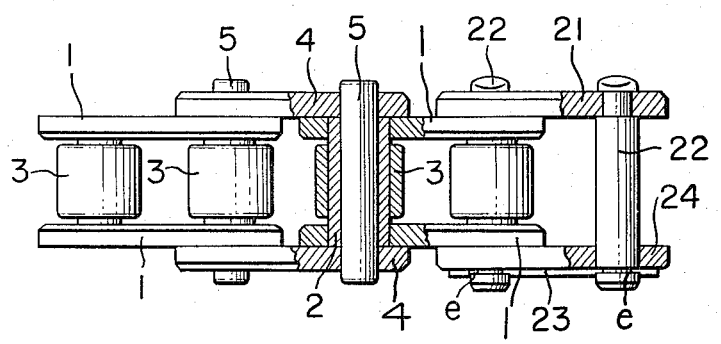
FIG. 7 is a front view showing a part used in the fourth embodiment of the locking member.
Figure 8:
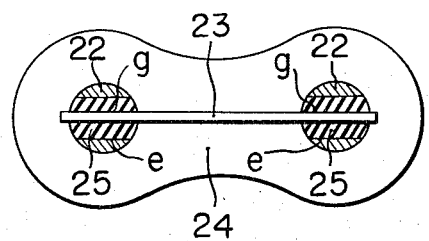
FIG. 8 is an enlarged view showing the securing means under different means from the embodiment in FIG. 7.
Figure 9:
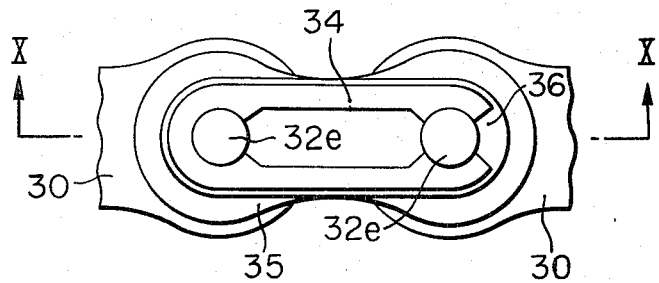
FIG. 9 is a front view showing a fifth embodiment of the locking member.
Figure 10:
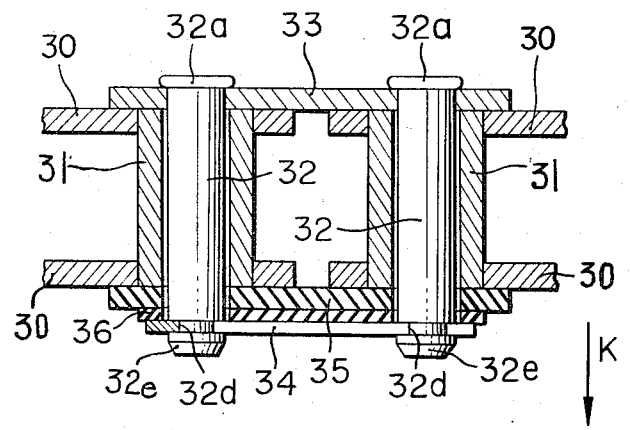
FIG. 10 is a sectional view taken along line X—X in FIG. 9.

What is claimed is:

1. A connecting link of roller chain, comprising a pair of link plates for connecting both ends of a length of chain, one link plate of said pair of said link plates having a pair of connecting pins integrally secured thereon adjacent to both ends of said one link plate, the other link plate fitted over said connecting pins adjacent to free ends thereof, and locking means of resilient material such as plastic resin or rubber placed outwardly on said other link plate and having a pair of openings snapped over said pair of said connecting pins adjacent to free ends thereof.

2. A connecting link of roller chain described in claim 1, wherein said locking means of resilient material is provided with reinforcing members located around said openings.

3. A connecting link of roller chain comprising a pair of link plates for connecting both ends of a length of chain, one link plate of said pair of said link plates having a pair of connecting pins integrally secured thereon adjacent to both ends of said link plate, the other link plate fitted over said connecting pins adjacent to free ends thereof, locking member placed outwardly on said the other link and removably fitted over said pair of connecting pins adjacent to extreme ends of said connecting pins, and shock absorbing means of resilient material located on said pair of said connecting pins in reduced portion thereof where said locking members are engaged.

4. A connecting link of roller chain, comprising a pair of link plates for connecting both ends of a length of chain, one link plate of said pair of said link plates having a pair of connecting pins integrally secured thereon adjacent to both ends of said link plate, the other link plate fitted over said connecting pins adjacent to free ends thereof, locking member placed outwardly on said the other link, a linear member inserted into an opening provided on each of said connecting pins adjacent to extreme end thereof, and shock absorbing means of resilient material inserted into said linear member passes through said connecting pin.

5. A connecting link of roller chain, comprising a pair of link plates for connecting both ends of a length of chain, one link plate of said pair of said link plates having a pair of connecting pins integrally secured thereon adjacent to both ends of said link plate, the other link plate fitted over said connecting pins adjacent to free ends thereof, locking member of light alloy placed outwardly on said the other link, and shock absorbing plate means of resilient material inserted between said the other link plate and said locking member.

* * * * *